UNITED STATES PATENT OFFICE 1,979,061

ACID ORTHO-HYDROXY AZO DYESTUFFS CAPABLE OF BEING CHROMED

Karl Zahn and Heinrich Koch, Frankfort-on-the-Main-Hochst, Germany, assignors to General Aniline Works, Inc., New York, N. Y., a corporation of Delaware No Drawing. Application June 16, 1933, Serial No. 676,205. In Germany June 30, 1932

4 Claims. (Cl. 260—76)

The present invention relates to new acid ortho-hydroxy azo dyestuffs which are capable of being chromed, more particularly it relates to disazo dyestuffs which are obtainable by coupling one mol of 2,2'-dihydroxy-1,1'-dinaphthyl-ar-octohydride of the formula:

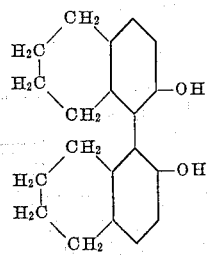

with 2 mols of a sulfo-ortho-hydroxy-diazo compound of the benzene or naphthalene series.

The new dyestuffs thus obtained may be represented by the general formula:

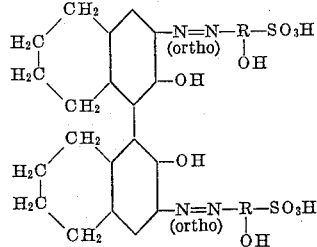

wherein the R's stand for radicals of the benzene or naphthalene series.

The non-hydrogenated simple and easily accessible 2,2'-dihydroxy-1,1'-dinaphthyl (β-dinaphthol) is not applicable for the production of azo dyestuffs as it does not couple with diazo compounds.

We have now found that the hydrogenation product from 2,2'-dihydroxy-1,1'-dinaphthyl, i. e. the ar-octohydro-2,2'-dihydroxy-1,1'-dinaphthyl is capable of being coupled with diazo compounds and yields disazo dyestuffs among which those obtainable with sulfo-ortho-hydroxy-diazo compounds are particularly distinguished by good fastness properties. The chromed dyeings on wool possess besides a very good fastness to washing, fulling and potting an excellent fastness to light.

The 2,2'-dihydroxy-1,1'-dinaphyl-ar-octohydride is obtainable by treating 2,2'-dihydroxy-1,1'-dinaphthyl with hydrogen in the presence of a hydrogenation catalyst, such as a nickel catalyst, under superatmospheric pressure in a suitable solvent or diluent, such as alcohol or water, or by hydrogenating a di-acyl compound of 2,2'-dihydroxy-1,1'-dinaphthyl and splitting off the acyl radicals from the hydrogenation product by saponification. It has a melting point of 139° C. to 140° C. The manufacture of the said compound is more fully disclosed in our co-pending application Serial No. 676,204 filed June 16, 1933 for "Hydrogenation products from 2,2'-dihydroxy- and 2,2'-di-O-acyl-1,1'-dinaphthyl" in the name of Karl Zahn and Heinrich Koch.

The following example serves to illustrate the invention, but it is not intended to limit it thereto, the parts being by weight:

23.4 parts of 6-nitro-2-aminophenol-4-sulfonic acid are diazotized in 60 parts of water and 10 parts of concentrated hydrochloric acid with 7 parts of sodium nitrite, and the whole is added to a solution of 14.7 parts of 2, 2'-dihydroxy-1, 1'-dinaphthyl-ar-octohydride in 200 parts of water and 30 parts of caustic soda solution of 40° Bé. When the coupling is finished, the solution is acidified by means of concentrated hydrochloric acid until it gives an acid reaction to Congo paper. The dyestuff which has been precipitated is filtered by suction and dried; it forms a brown powder. The dyestuff dyes wool from an acid bath. The after-chromed dyeings possess brown shades.

The dyestuff corresponds to the following formula:

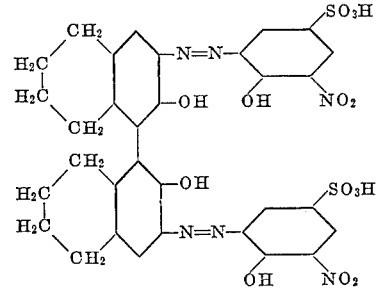

By using instead of 6-nitro-2-aminophenol-4-sulfonic acid equivalent quantities of 4-nitro-2-aminophenol-6-sulfonic acid, 2-aminophenol-4-sulfonic acid, 2-aminophenol-5-sulfonic acid, 4-chloro-2-aminophenol-6-sulfonic acid, 1-amino-2-naphthol-4-sulfonic acid, nitro-1-amino-2-naphthol-4-sulfonic acid or other sulfo-ortho-hydroxy-amino-compounds of the benzene or naphthalene series as diazotizing component, dyestuffs are obtained which dye wool similar tints.

The after-chromed dyeings are distinguished by a very good fastness to washing, fulling and potting and an excellent fastness to light.

We claim:

1. The acid ortho-hydroxy-azo dyestuffs of the general formula:

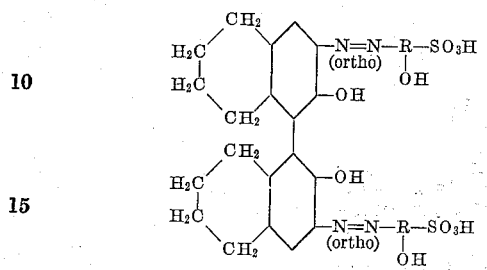

wherein the R's stand for radicals of the benzene or naphthalene series, which dyestuffs dye wool from an acid bath and are capable of being after-chromed, the chromed dyeings possessing brown tints of good fastness properties.

2. The acid ortho-hydroxy-azo dyestuffs of the general formula:

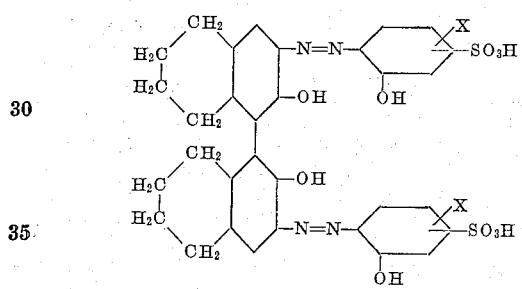

wherein the X's stand for hydrogen, $NO_2$ or halogen, which dyestuffs dye wool from an acid bath and are capable of being after-chromed, the chromed dyeings possessing brown tints of good fastness properties.

3. The acid ortho-hydroxy-azo dyestuffs of the formula:

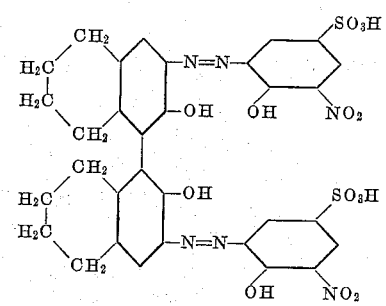

which dyestuff forms, when dry, a brown powder and yields on wool from an acid bath brown tints which, when after-chromed, possess very good fastness to washing, fulling and potting and excellent fastness to light.

4. The acid ortho-hydroxy-azo dyestuffs of the formula:

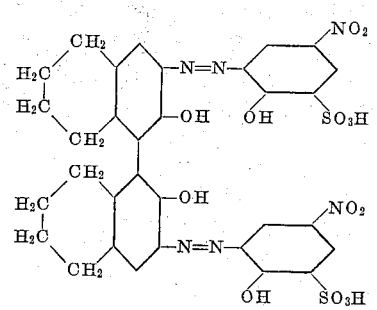

which dyestuff forms, when dry, a brown powder and yields on wool from an acid bath brown tints which, when after-chromed, possess very good fastness to washing, fulling and potting and excellent fastness to light.

KARL ZAHN.
HEINRICH KOCH.